(12) United States Patent
Raghavan et al.

(10) Patent No.: US 12,381,608 B2
(45) Date of Patent: Aug. 5, 2025

(54) BASE STATION TRANSMISSION OF RF COMPONENT PRECISION REQUIREMENTS TO UES

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 18/154,467

(22) Filed: Jan. 13, 2023

(65) Prior Publication Data
US 2024/0243789 A1 Jul. 18, 2024

(51) Int. Cl.
*H04B 7/06* (2006.01)
*H04B 7/01* (2006.01)

(52) U.S. Cl.
CPC ........... *H04B 7/0617* (2013.01); *H04B 7/01* (2013.01); *H04B 7/0619* (2013.01)

(58) Field of Classification Search
None
See application file for complete search history.

(56) References Cited

U.S. PATENT DOCUMENTS

| | | | | |
|---|---|---|---|---|
| 12,040,557 B1* | 7/2024 | Sharma | ................... | H01Q 3/38 |
| 2019/0393948 A1* | 12/2019 | Zhao | ................... | H04B 7/0408 |
| 2020/0021346 A1* | 1/2020 | Xie | ................... | H04W 72/0453 |
| 2020/0042287 A1* | 2/2020 | Chalamalasetti | ...... | G06N 3/065 |
| 2021/0110508 A1* | 4/2021 | Mellempudi | ............. | G06F 5/01 |

* cited by examiner

Primary Examiner — Minh Trang T Nguyen
(74) Attorney, Agent, or Firm — Arent Fox, LLP

(57) ABSTRACT

Aspects of the present disclosure relate to signaling between network entities to mitigate, through management of phase shifter or amplitude controller precision, increased interference applied to a network node during uplink beamforming resulting from low phase shift or amplitude control precision. A UE transmits first uplink data in a first beam using a phase shifter or an amplitude controller configured with a first bit precision. The UE receives a message from a network entity indicating to change the first bit precision to a different, second bit precision in response to the first beam interfering with downlink communications from or to a network node. The UE afterwards transmits second uplink data in a second beam using the phase shifter or the amplitude controller reconfigured with the second bit precision. Thus, interference from lower precision phase shifters or amplitude controllers may be avoided.

30 Claims, 12 Drawing Sheets

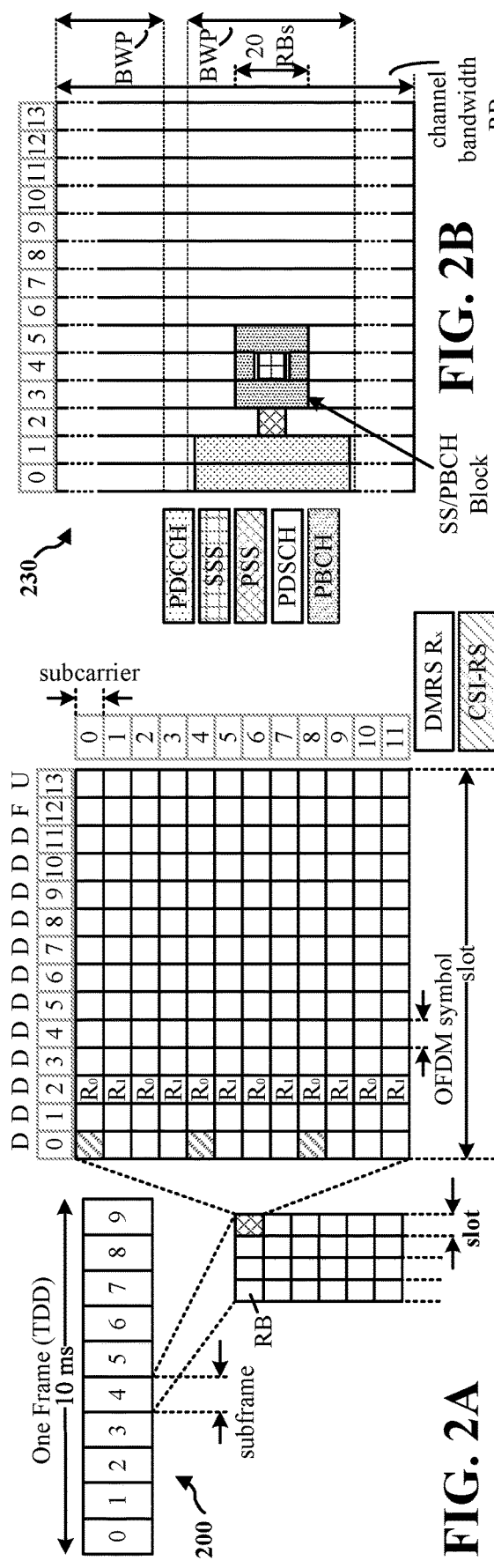
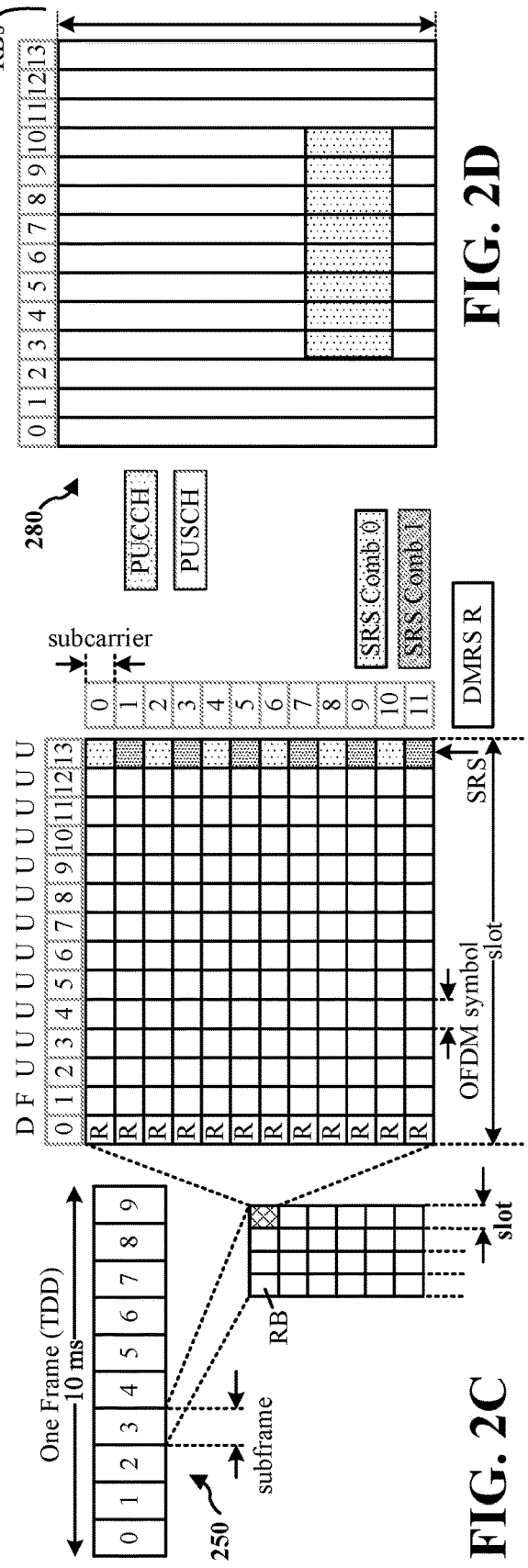
FIG. 2A
FIG. 2B
FIG. 2C
FIG. 2D

BASE STATION TRANSMISSION OF RF COMPONENT PRECISION REQUIREMENTS TO UES

TECHNICAL FIELD

The present disclosure generally relates to communication systems, and more particularly, to wireless communication systems to mitigate interference resulting from low phase shifter or amplitude controller precision.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus includes a processor, memory coupled with the processor, and instructions stored in the memory and operable, when executed by the processor, to cause the apparatus to: transmit first uplink data in a first beam using a phase shifter or an amplitude controller configured with a first bit precision; receive a message from a network entity indicating to change the first bit precision to a second bit precision in response to the first beam interfering with downlink communications from or to a network node, the second bit precision being different than the first bit precision; and transmit second uplink data in a second beam using the phase shifter or the amplitude controller reconfigured with the second bit precision.

In an aspect of the disclosure, a method, a computer-readable medium, and an apparatus are provided. The apparatus may be a network entity such as a base station. The apparatus includes a processor, memory coupled with the processor, and instructions stored in the memory and operable, when executed by the processor, to cause the apparatus to: receive first uplink data in a first beam from a UE including a phase shifter or an amplitude controller configured with a first bit precision; transmit a message indicating to change the first bit precision to a second bit precision in response to the first beam interfering with downlink communications from or to a network node, the second bit precision being different than the first bit precision; and receive second uplink data in a second beam from the UE including the phase shifter or the amplitude controller reconfigured with the second bit precision.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first subframe within a 5G NR frame structure.

FIG. 2B is a diagram illustrating an example of DL channels within a 5G NR subframe.

FIG. 2C is a diagram illustrating an example of a second subframe within a 5G NR frame structure.

FIG. 2D is a diagram illustrating an example of UL channels within a 5G NR subframe.

DETAILED DESCRIPTION

Figure 1A:
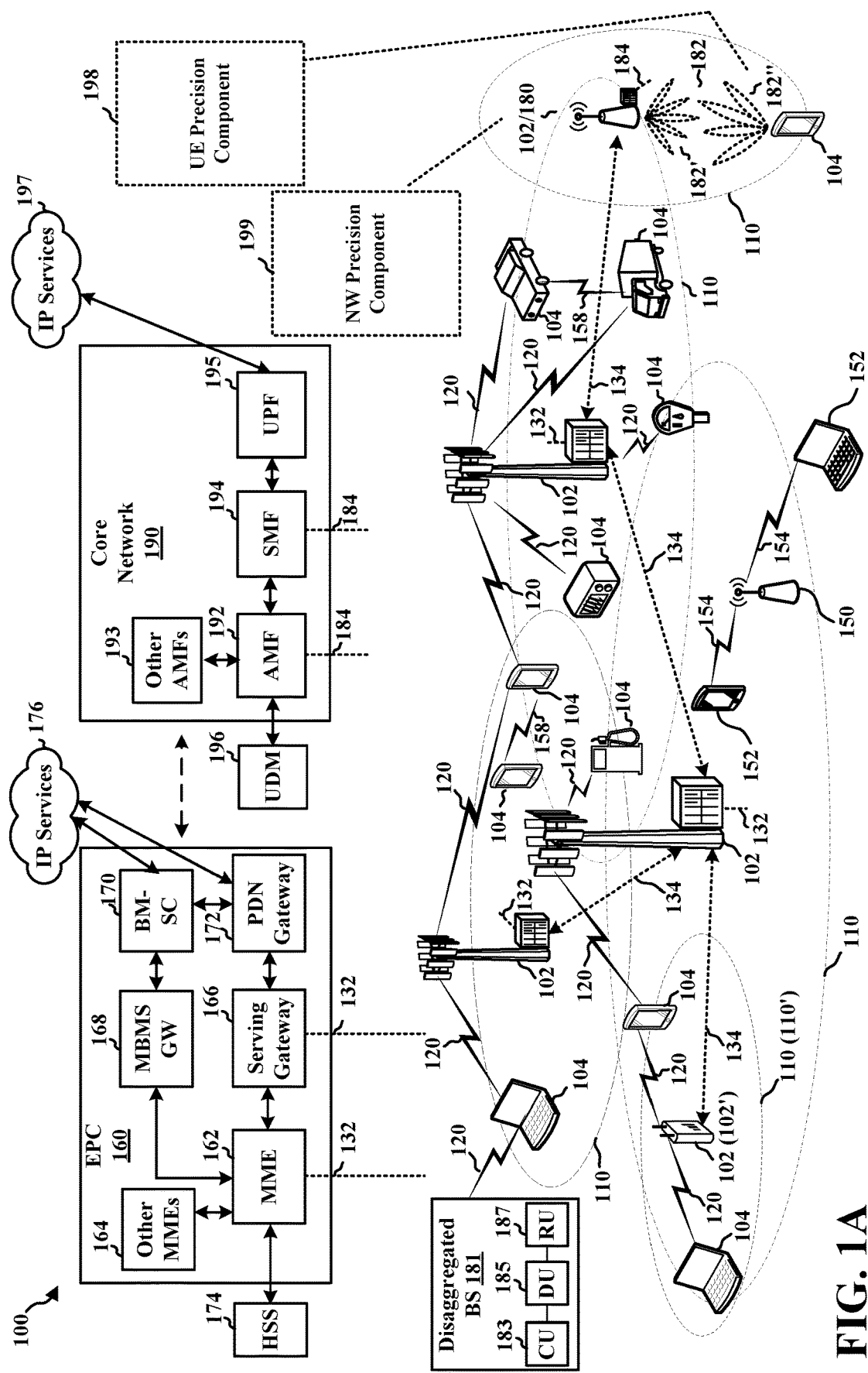
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Low-resolution phase shifters or amplitude controllers may be used for beamforming in many low-cost devices or applications, such as in New Radio (NR)-Light or Internet of Things (IoT). Similarly, high-resolution phase shifters or amplitude controllers may often be implemented in many devices that may dynamically select to apply a lower resolution on a use-case basis for power savings or performance enhancement purposes. For example, from a higher resolution, B=5 bit nominal phase shifter, a UE may select to apply a lower resolution, B=2 bit phase shifter at one time when power savings would be helpful, such as when the UE has a low battery life, and to apply a B=3 bit resolution at another time when improved performance would be helpful, such as in cases where such low-resolution components may still likely achieve sufficient performance. However, when a UE uses a low-resolution phase shifter or amplitude controller in beamforming, the UE may produce side lobes with significant signal-to-interference-and-noise ratios (SINRs) in direction(s) that previously have not experienced interference at higher phase shift or amplitude control resolutions. Such side lobes due to use of lower precision phase shift or amplitude control may lead to interference which affects another network node in a same cell as the UE or in a neighboring cell.

Aspects of the present disclosure relate to signaling between base stations or between base stations and user equipment (UEs) to mitigate, through management of phase shifter or amplitude controller precision, increased interference applied to a network node during uplink beamforming resulting from low phase shift or amplitude control precision. The base station serving the UE (an intra-cell base station) or the other network node (such as an inter-cell base station) may indicate to the UE to increase the precision of its phase shifters or amplitude controllers to mitigate the interference. For example, if a side lobe resulting from a lower precision phase shifter at the UE interferes with a base station or transmission reception point (TRP) transmitting on the downlink in a neighboring cell or interferes with another UE receiving on the downlink in the neighboring cell, the affected network node may inform the base station of the interference. For instance, the base station of the interfered cell or the affected UE may provide an interference report to the base station of the interfering cell serving the interfering UE, a request for increased precision in the phase shifters or amplitude controllers of the interfering UE to avoid future/further interference, or a recommended precision for one or more UEs in the interfering cell. Following reception of a message from the base station to change its precision, the interfering UE may use higher-resolution phase shifters or amplitude controllers in subsequent beamforming operations during uplink communications, such as a B=5 bit precision instead of a B=2 bit precision, to reduce the interference due to the side lobe affecting the other network node. In this way, the interference that resulted from use of lower precision phase shifters or amplitude controllers may be avoided in subsequent communications, and overall network performance may thus be improved.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1A, in certain aspects, the UE 104 may include an UE precision component 198 that is configured to transmit first uplink data in a first beam using a phase shifter or an amplitude controller configured with a first bit precision; receive a message from a network entity indicating to change the first bit precision to a second bit precision in response to the first beam interfering with downlink communications from or to a network node, the second bit precision being different than the first bit precision; and transmit second uplink data in a second beam using the phase shifter or the amplitude controller reconfigured with the second bit precision. In certain aspects, the base station 102/180 (or other network entity with base station functionality) may include a NW precision component 199 that is configured to receive first uplink data in a first beam from a user equipment (UE) including a phase shifter or an amplitude controller configured with a first bit precision; transmit a message indicating to change the first bit precision to a second bit precision in response to the first beam interfering with downlink communications from or to a network node, the second bit precision being different than the first bit precision; and receive second uplink data in a second beam from the UE including the phase shifter or the amplitude controller reconfigured with the second bit precision.

Figure 1B:
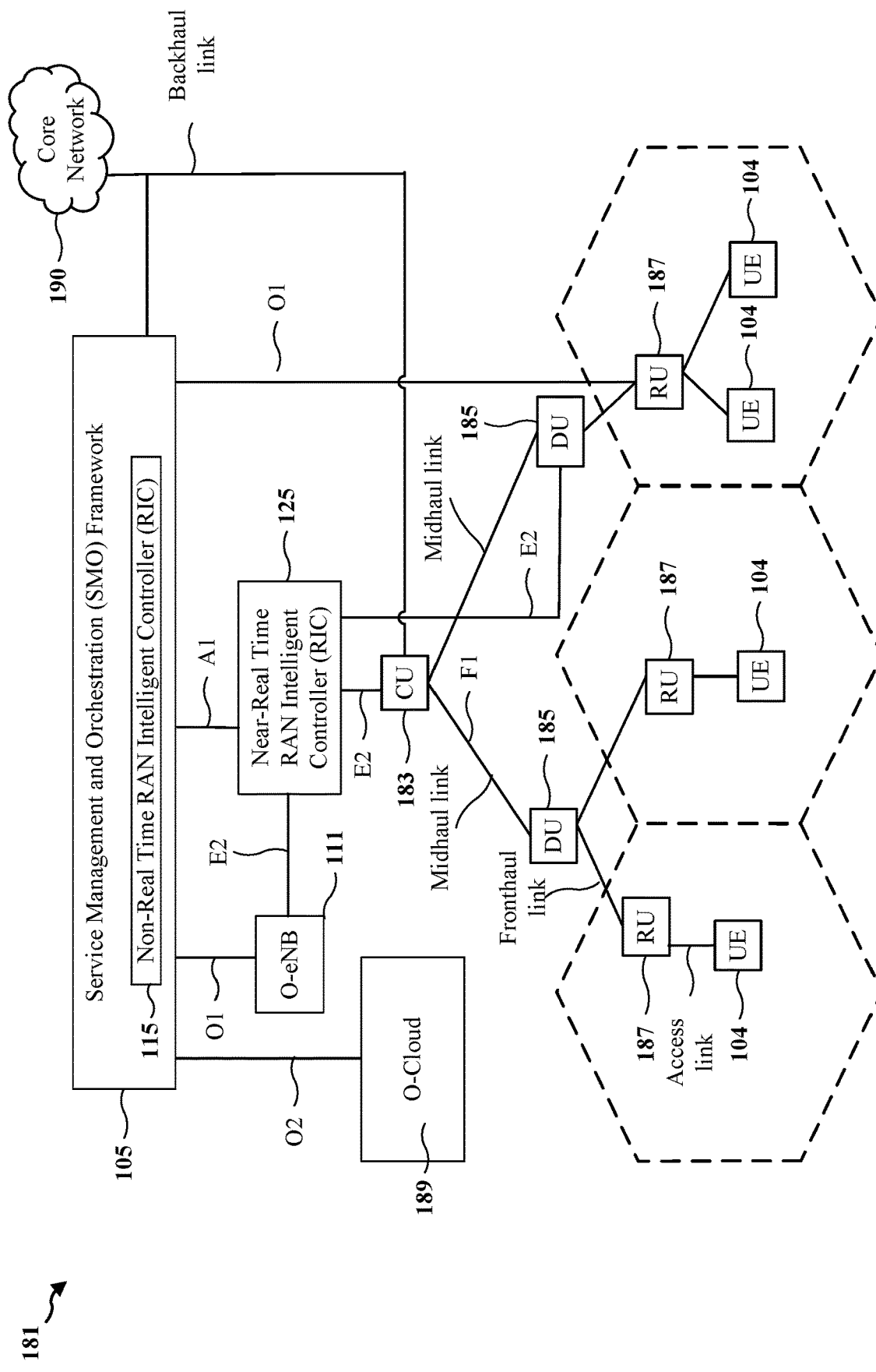
FIG. 1B shows a diagram illustrating an example disaggregated base station architecture.

FIG. 1B shows a diagram illustrating an example disaggregated base station 181 architecture. The disaggregated base station 181 architecture may include one or more CUs 183 that can communicate directly with core network 190 via a backhaul link, or indirectly with the core network 190 through one or more disaggregated base station units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUs 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more base station functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^{\mu}*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
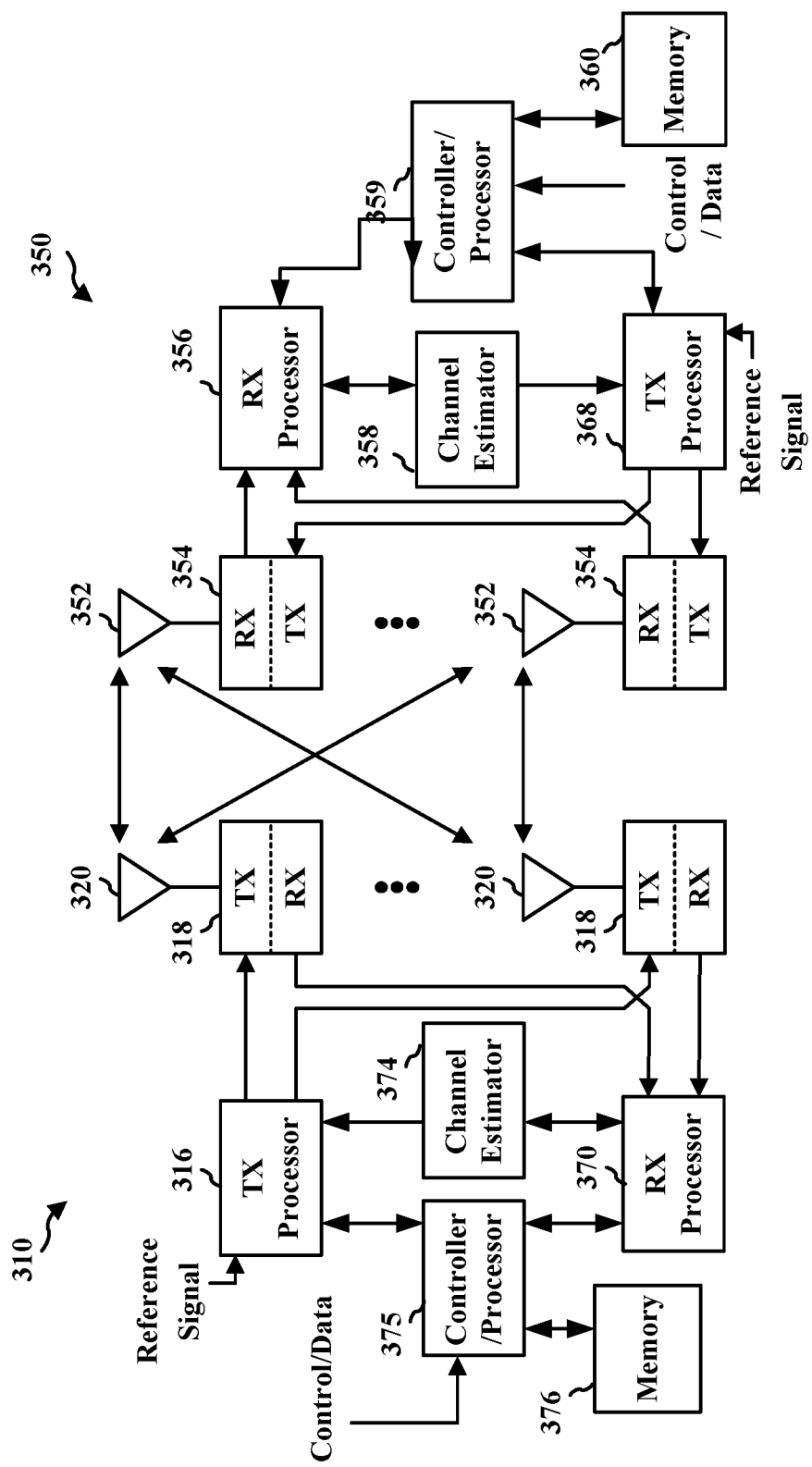
FIG. 3 is a block diagram of a base station in communication with a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE precision component 198 of FIG. 1A.

At least one of the TX processor 316, the RX processor 370, and the controller/processor 375 may be configured to perform aspects in connection with NW precision component 199 of FIG. 1A.

Figure 4B:
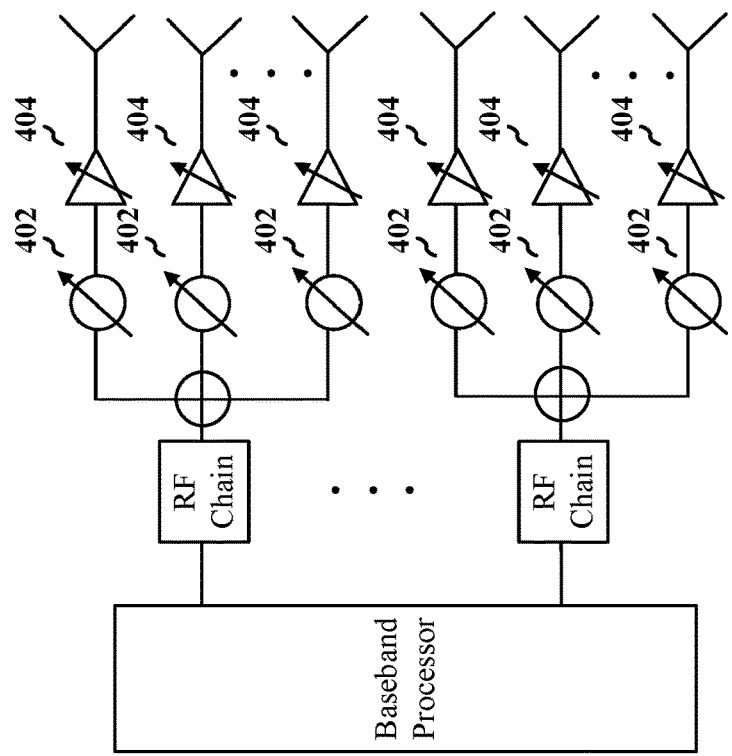
FIGS. 4A and 4B illustrate examples of analog and hybrid beamforming technologies that may be implemented in a UE, respectively, for uplink transmissions.
Figure 4A:
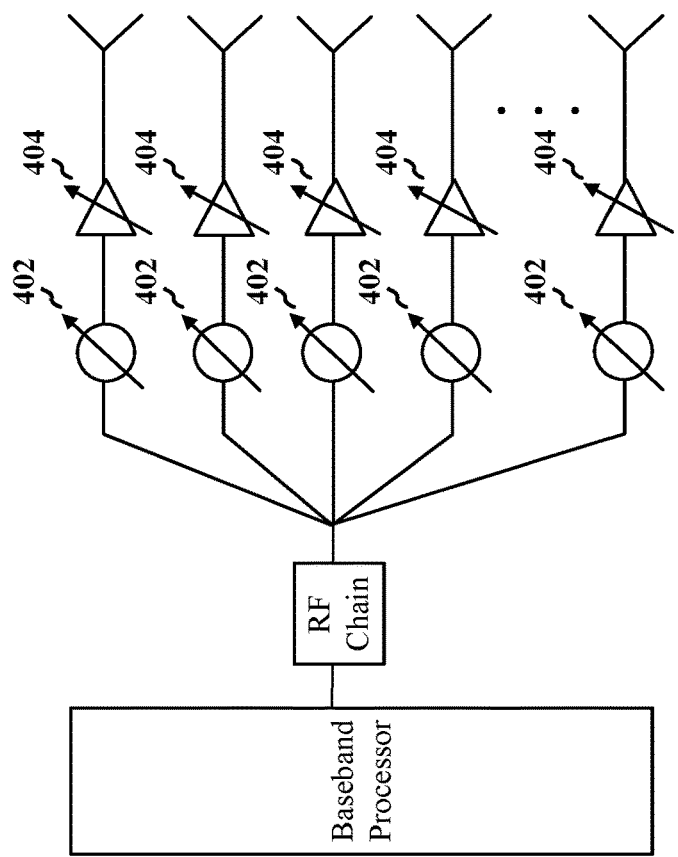

FIGS. 4A and 4B illustrate examples 400, 450 of analog and hybrid beamforming technologies that may be implemented in UE 104, 350, respectively, for uplink transmissions. In the analog beamforming example of FIG. 4A, a baseband processor such as a digital signal processor (DSP) may be coupled to a single RF chain, which in turn may be coupled to an antenna array including multiple antenna elements such as antennas 352. A phase shifter 402 and an amplitude controller 404 (such as a variable power amplifier) may be coupled between the RF chain and respective antennas to adjust the shape and phase (and thus direction) of a beam formed by the combination of antennas 352. Similarly, in the hybrid beamforming example of FIG. 4B, multiple RF chains coupled to the baseband processor are connected respectively to phase shifters 402 and amplitude controllers 404 of different antenna subarrays respectively including multiple antenna elements such as antennas 352. While the examples of FIGS. 4A and 4B illustrate phase shifters 402 and amplitude controllers 404 being coupled to RF chains, in other examples, the phase shifters 402 or amplitude controllers 404 may be within an RF chain, coupled to one RF chain and within another RF chain, or the like.

In mmW systems such in frequency range 2 (FR2) or beyond, UEs 104, 350 may apply discrete Fourier transform (DFT) beam weights for beam steering. For example, when performing analog or hybrid beamforming (such as during precoding after modulation and layer mapping), the UE 104, 350 may control phase shifters 402 or amplitude controllers 404 coupled to its RF chain(s) to arrive at directional beam weights which the UE may apply to a baseband processed signal to steer its energy along a certain direction of the beamspace. If the phase shifters 402 or amplitude controllers 404 have a large bit precision or resolution, the beam weights may have predictable beam properties. For example, assuming an infinite-bit phase precision for phase shifters 402, an antenna array with N antenna elements may have a peak array gain of $10 \log_{10}(N)$ dB, a first side lobe delta of ~13.2 dB (relative to a main lobe of a beam), and a 3-dB beamwidth of ~100/N degrees. However, practically phase shifters 402 and amplitude controllers 404 do not have an infinite bit precision or resolution, and are instead designed in chipsets with a B-bit precision where B=3 or 5 or more bits depending on cost, complexity, or performance factors.

Nevertheless, as cellular applications evolve, the demand for phase shifters 402 or amplitude controllers 404 with lower complexity, precision or resolution may increase. For example, even if a UE has the capability of supporting a B=5+ bit precision for its phase shifters 402, the RF circuitry that would allow such high resolutions to be implemented would utilize a significant amount of area and consume a significant amount of power and hence dissipate considerable thermal overheads.

For instance, a phase shifter with a B-bit resolution typically uses B stages of RF circuitry to enable phase shifting operations, translating to higher values of B using more chip or circuit area (and thus more volume manufacturing cost) than lower values of B. Thus, manufacturers may instead design UE modems to support B=2 or 3 bit precision in its phase shifters 402 to save chip area and power consumption and thus provide a competitive advantage over other original equipment manufacturer (OEM) designs. For example, a B=2 bit phase shifter that uses 0°, 90°, 180° and 270° as nominal phase values may simply activate only in-phase (I) or quadrature (Q) signals (but not both I and Q signals) to arrive at beam weights corresponding to these phases of 1, i, −1, or −i. Thus, low-resolution phase shifters or amplitude controllers may be designed for applications benefitting from reduced cost or power, such as in NR-Light or Internet of Things (IoT) applications. Furthermore, Wi-Fi-capable modems that are designed using low-resolution phase shifters or amplitude controllers may be efficiently reused for use in 5G cellular applications using similar low-precision RF components (2+ bits).

Moreover, UEs may be capable of dynamically selecting between different precision for its phase shifters 402 or amplitude controllers 404 at different points of time to provide power savings and mitigate thermal overheads. For example, while phase shifters typically consume a small amount of power relative to the RF chain at mmW frequencies and beyond, phase shifters consume a larger fraction of the power on the reception (Rx) path than on the transmission (Tx) path, and since the bandwidth of Rx components such as low noise amplifiers (LNAs) may be larger than the bandwidth of Tx components such as power amplifiers (PAs) in systems affording ultra-wide bandwidth coverage such as greater than 10 GHz in frequency range 4 (FR4), more antenna elements may have an Rx path than a Tx path which cause power consumption associated with phase shifters to quickly add up at higher frequencies. Thus, phase shifters 402 may be designed such that a UE may dynamically switch between a 2-bit precision and a 3-bit precision, between a 2-bit (or 3-bit) precision and a 5-bit precision, and the like. In such cases, a UE that dynamically selects to use a B=2 bit phase shifter may apply one of four beam weights (1, i, −1, or −i) calculated using I and Q components to save power, while a UE that dynamically selects to use a B=5 bit phase shifter may apply one of thirty-two beam weights calculated using I and Q components to improve performance. As a result, dynamic configuration of phase shifter quantization may provide significant power savings that may be obtained using B=2 bit phase shifters relative to B=5 bit phase shifters.

With respect to dynamic configuration of amplitude control quantization, sub-sampling of amplitude stages from a set of possible amplitudes that can be configured in the RF circuitry of amplitude controllers 404 may similarly lead to power savings. Generally, amplitude control capability may fall within three parts: a range of amplitude control (referring to the difference between the largest and smallest quantized amplitude value), resolution or step size (capturing the gap between adjacent quantized values of amplitude), and accuracy (capturing the spread over which random errors can occur in quantization due to radio frequency hardware issues). Resolution and accuracy may also be non-uniform, with closely spaced quantized values at one end of a range and farther spaced quantized values at another end of the range. Different quantization levels may be associated with different levels of power consumption, such as −6.02 dB at a first quantization level, −7.02 dB at a second quantization level, −8.02 dB at a third quantization level, and so forth. Since larger quantization levels may thus be associated with greater power consumption, amplitude controllers 404 may be designed such that a UE may dynamically switch between different B-bit precisions through sub-sampling of amplitude stages, for instance between eight (B=3) and four (B=2) total quantities of available quantization levels. As an example, if an amplitude controller is configured with a B=3 bit precision, a 1 dB step size, and a uniform power consumption beginning at −6.02 dB, then dynamically sub-sampling the range of amplitude control to a B=2 bit precision with a same 1 dB step size may lead to power savings since parts of the RF circuitry associated with higher quantization levels may be deactivated. As a result, dynamic configuration of amplitude control quantization may similarly provide significant power savings that may be obtained using B=2 bit phase shifters relative to B=3+ bit phase shifters.

Figures 5A, 5B:
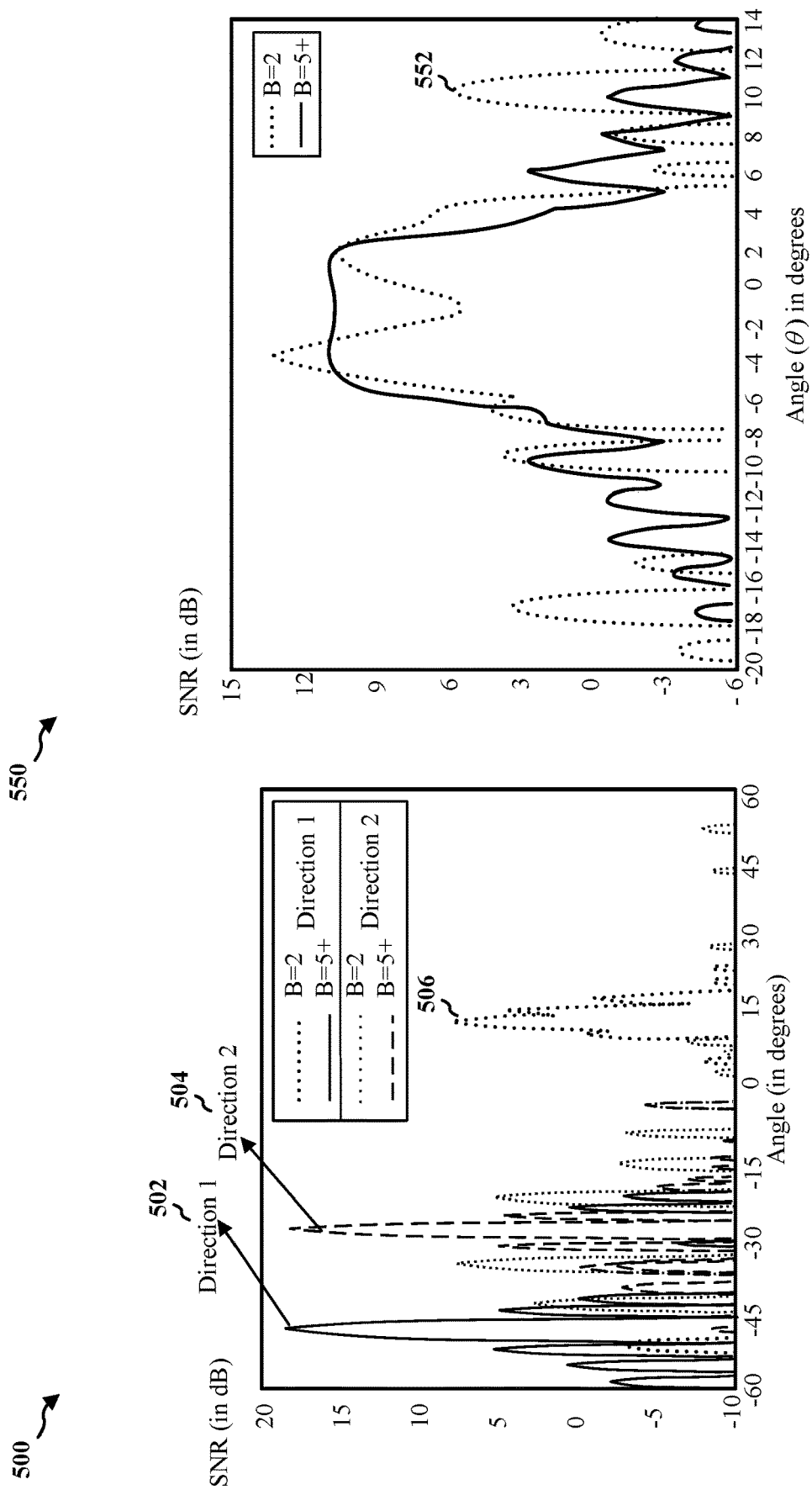
FIGS. 5A-5B illustrate examples of narrow and wide beams, respectively, formed from an N-element linear array of a UE using phase shifters or amplitude controllers at different B-bit precisions.

FIGS. 5A-5B illustrate examples 500, 550 of narrow and wide beams, respectively, formed from an N-element linear array of UE 104, 350 (where N=64 in these examples) using phase shifters 402 or amplitude controllers 404 at different B-bit precisions (where B=2 and 5+ in these examples for simplicity of illustration, although in other examples B=2, 3, 4, and 5+). In the example 500 of FIG. 5A, two signals are phase shifted at different angles or degrees, namely −48° and −28°, to result in respective narrow beams having their main lobes steered toward different directions 502, 504. However, the side lobes of these beams may have significantly higher signal levels at lower B-bit precisions than at higher B-bit precisions. For example, side lobe 506 at around 15° may have a strength that has a relatively small delta with respect to the −48° main lobe at B=2, such as a difference of 11 dB between the 18 dB main lobe and the 7 dB side lobe, compared to the B=5, where the side lobe 506 is negligible at −10 dB and thus the delta from the 18 dB main lobe has increased to 28 dB. Thus, if the UE steers its beam towards direction 502 using phase shifters 402 or amplitude controllers 404 configured with a B=2-bit precision, another network node such as a base station or UE positioned in the direction of side lobe 506 may experience interference due to the relatively small signal strength delta that otherwise may not have existed with a higher resolution such as a B=5-bit precision. Similarly, in the example 550 of FIG. 5B, a broad beam having a peak SINR of ~10 dB at its main lobe but having a signal strength of ~5 dB at side lobe 552 with a B=2 bit precision would create interference in the direction of side lobe 552 that otherwise may not have existed at B=5 bit precision (due to the lower SINRs of side lobe 552 associated with those higher resolutions). Thus, it would be helpful to address this interference created on other network nodes as a result of lower precisions which UEs may statically or dynamically apply during beamforming in its phase shifters or amplitude controllers.

Figure 6:
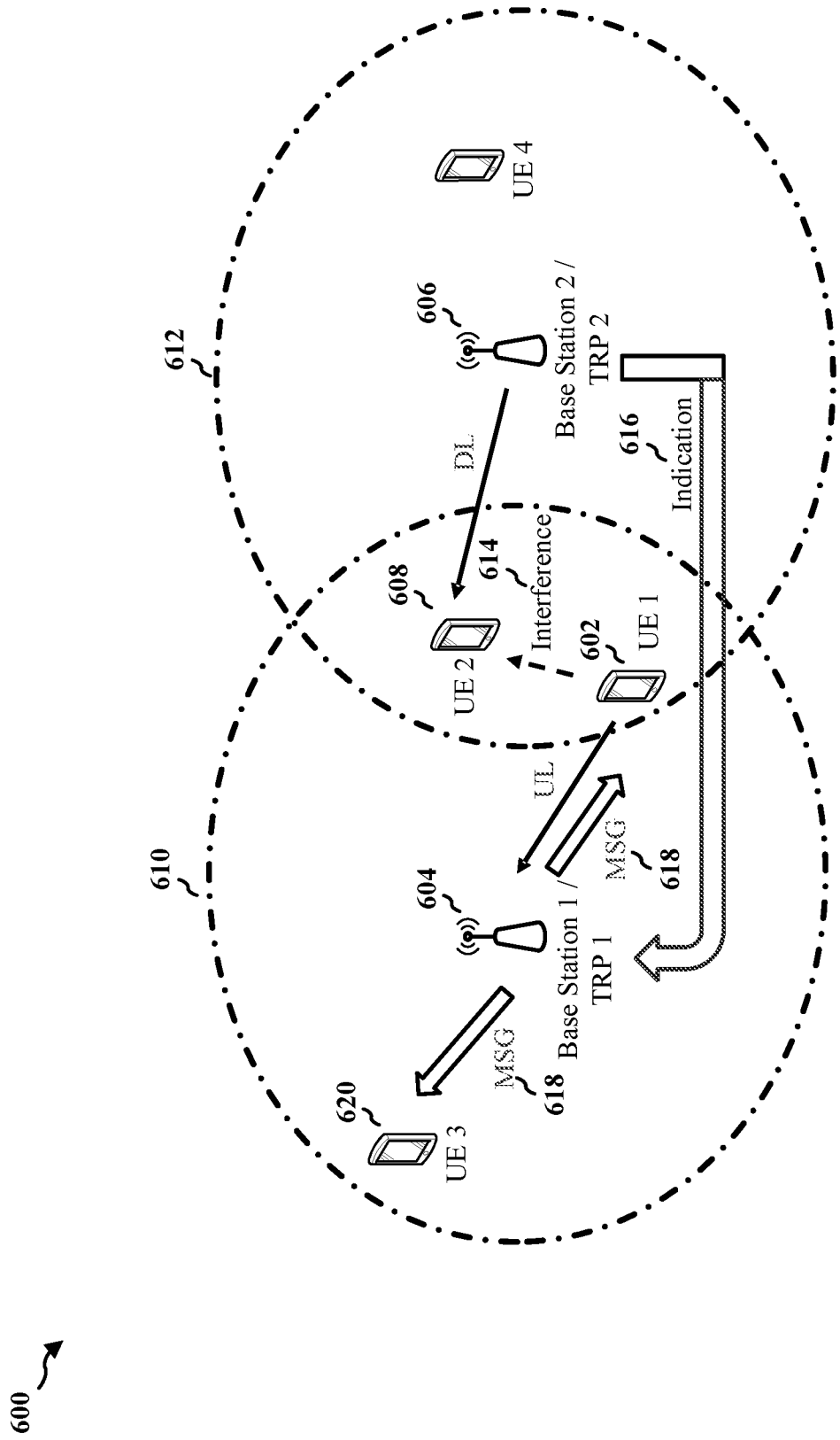
FIG. 6 illustrates an example of base station signaling that may trigger an increase in precision of a phase shifter or amplitude controller of a UE as a result of inter-cell interference.

FIG. 6 illustrates an example 600 of base station signaling that may trigger an increase in precision of a phase shifter or amplitude controller of a UE (such as UE 104, 350 including phase shifters 402 and amplitude controllers 404) as a result of inter-cell interference. In this example, a first UE 602 communicates with a first base station 604 (or first TRP) in uplink, and a second base station 606 (or second TRP) communicates with a second UE 608 in downlink. In this example, first base station 604 may receive data from first UE 602 in a first cell 610, while second base station 606 may transmit data to second UE 608 in a second cell 612 neighboring the first cell 610. Alternatively, first base station 604 may receive data from first UE 602 and transmit data to second UE 608 in the same, first cell 610.

When first UE 602 communicates with first base station 604 in uplink, first UE 602 configures its phase shifters 402 or amplitude controllers 404 to form a first beam using a low precision. For example, first UE 602 may steer a narrow beam in direction 502 using a B=2-bit precision such as illustrated in FIG. 5A. As a result, side lobe 506 of the first beam may result in interference 614 on second UE 608 which hinders or prevents second UE 608 from successfully receiving the downlink communication from second base station 606 (or from first base station 604). Since the interfering uplink operation may take time, second UE 608 may be impacted by the interference 614 for a sustained period of time. In response to determining the presence of this interference 614, second base station 606 may provide an indication 616 to first base station 604 that one or more of its UEs such as first UE 602 is causing increased or enhanced interference such as cross-link interference (CLI), and therefore that first base station 604 should request its UE(s) to apply a higher precision for their phase shifters 402 or amplitude controllers 404 to mitigate this CLI.

In one example, the indication 616 may be communicated from second base station 606 to first base station 604 via a backhaul link between the base stations 604, 606, via a control plane, via a user plane, or in some other manner of information exchange. For example, second UE 608 may provide a CSI report to second base station 604 in response to CSI-RS, CSI-IM or other reference signals indicating its SINR is low due to interference 614, and in response to the CSI report, second base station 604 may be triggered to provide the indication 616 to the first base station 604 via a backhaul link informing first base station 604 of the interference 614 and requesting or recommending the first base station 604 to communicate with its UEs to improve their precision and address this interference. In another example, second UE 608 may provide this indication 616 directly or indirectly to first base station 604 in uplink. For instance, in the illustrated example of FIG. 6 where second UE 608 is within the same, first cell 610 as first UE 602 and may receive signals from base stations 604, 606 or multiple TRPs at the same time, second UE 608 may provide the indication 616 directly to first base station 604 (if the interference 614 does not hinder or prevent second UE 608 from communicating with first base station 604), or second UE 608 may provide the indication 616 to second base station 606 to be forwarded to first base station 604 via a backhaul link.

In one example, indication 616 may be an interference report indicating information regarding interference 614. For example, the interference report may generically inform first base station 604 of the presence of interference 614. Alternatively, the indication 616 may indicate more specific information about interference 614 than a merely generic report that such interference exists. For example, the interference report may include a direction towards which the second UE 608 is listening for or receiving data, an amount of interference 614 such as a current SINR that second UE 608 is experiencing, a time period or timestamp (such as in symbols or slots) when second UE 608 is experiencing a low SINR condition, or other information regarding interference 614 that allows the base station to identify the source of the interference. In another example, indication 616 may be a request for first base station 604 to minimize or avoid the interference 614, such as by having one or more of the UEs which first base station 604 serves in its cell to change their precision of their phase shifters 402 or amplitude controllers 404. Indication 616 may also or alternatively expressly request the first base station 604 to address the interference 614 by instructing one or more of its UEs to change their precision of their phase shifters 402 or amplitude controllers 404, rather than merely requesting the base station to generically address interference 614. In a further example, indication 616 may be a recommendation for first base station 604 to have one or more of its UEs change their precision of their phase shifters 402 or amplitude controllers 404. For example, rather than merely requesting first base station 604 to address interference 614 or instructing its UEs to increase their precision, indication 616 may include a recommended precision (such as a specific value of B) that first base station 604 may refer to when instructing its UEs to increase their precision. For example, first base station 604 may indicate the recommended precision as a precision target to which first UE 602 is to increase its precision of its phase shifters 402 or amplitude controllers 404 to address the interference 614.

In response to this indication 616 (an interference report, a precision change request, a precision change recommendation, or a combination of any of the foregoing), first base station 604 may transmit a message 618 to first UE 602 to change its precision for its phase shifters 402 or amplitude controllers 404. For example, the message 618 may indicate first UE 602 to generally adjust the precision of its phase shifters 402 or amplitude controllers 404 to reduce, minimize, or cancel the interference 614, or more specifically to perform certain actions to achieve this purpose such as increasing the precision of its phase shifters 402 to at least a threshold such as a B=5-bit precision, decreasing the precision of its amplitude controllers 404 using sub-sampling to at most a threshold such as a B=2-bit precision, or limiting transmission power of amplitude controllers 404 through precision changes such as through reducing the largest available quantized value or increasing the smallest available quantized value that may be configured in an amplitude control range. The first base station 604 may provide message 618 to first UE 602 via an SSB, a CSI-RS, PDSCH, DCI in PDCCH, an RRC configuration, a MAC-CE, or via some other manner. For example, first base station 604 may piggyback or overlay the message 618 in slots carrying one or more SSBs or CSI-RSs. The message 618 may indicate a UE such as first UE 602 to change the precision of both its phase shifters 402 and amplitude controllers 404 (either to same or different precision targets, such as both to B=5 bits, or one to B=3 bits while the other to B=5 bits), to change the precision of one of either its phase shifters 402 or amplitude controllers 404, to change the precision of a subset of its phase shifters 402 or amplitude controllers 404 (either to same or different precision targets), or to otherwise change the precision or resolution of one or more phase shifters or one or more amplitude controllers. The message 618 may indicate a UE such as first UE 602 to change the precision of its phase shifters or amplitude controllers indefinitely (or until a subsequent message is sent), or for an indicated period of time. In the latter case, the message 618 may also indicate the UE to change its precision multiple times over multiple time periods, such as from B=2 bit to B=3 bit for one period of time, and then from B=3 bit to B=5 bit for another period of time (or indefinitely until a subsequent message is sent).

In one example, the message 618 may expressly indicate the precision requirements (such as the value of B) to which a UE such as first UE 602 is to change the precision of its phase shifters 402 or amplitude controllers 404. Alternatively, in another example, the message 618 may more generally indicate a UE such as first UE 602 to change its precision according to whatever the UE selects, whether or not the message includes a precision requirement. For instance, the message 618 may not expressly indicate a precision requirement, in response to which the UE selects its own value of B to increase, or the message 618 may expressly indicate a precision recommendation the UE may follow, in response to which the UE selects its own value of B to increase subject to the recommendation (such as a minimum value of B).

In one example, the message 618 may be broadcast to multiple UEs in the first cell 610. For instance, in the illustrated example of FIG. 6, the first base station 604 may broadcast the message 618 to first UE 602 and to third UE 620 in the first cell 610, such as via one or more SSBs. In another example, the message 618 may be multicast to multiple UEs in the first cell 610, such as based on information in indication 616. For instance, if indication 616 is an interference report including time periods or other timing information regarding the interference 614, first base station 604 may determine to multicast the message 618 to the UEs that were scheduled to transmit data during those particular time periods (such as first UE 602). In a further example, the message 618 may be unicast to first UE 602, such as via one or more CSI-RSs or other RSs. For instance, first base station 604 may determine from the indication 616 (such as from timing information similar to the multicast example) that first UE 602 is the aggressor or cause of the interference 614 and therefore transmit the message 618 directly to first UE 602 to increase its phase shifter or amplitude controller precision. The first base station 604 may statically broadcast, multicast, or unicast the message 618, or alternatively the first base station may dynamically determine whether to broadcast, multicast, or unicast the message 618. For example, the first base station 604 may broadcast or multicast the message 618 if the resulting overhead from a broadcast or multicast would be less, such as where there are fewer users in the first cell 610, or if the first base station 604 may not readily ascertain the aggressor UE which caused interference 614, such as where the base station may not easily determine whether the interfering UE is first UE 602 or third UE 620. Otherwise, the first base station 604 may unicast the message 618 if the resulting overhead from a broadcast or multicast would be more, such as where there are greater users in the first cell 610, or if the first base station 604 may readily ascertain the aggressor UE which caused interference 614, such as where the network is less dense.

In one example, first UE 602 may provide a capability information message indicating the first UE 602 has a supported bit precision of B=5 bits for its phase shifters 402 or amplitude controllers 404, or indicating that the first UE 602 supports a dynamic precision change capability allowing it to dynamically change its precision to B=5 bits for its phase shifters 402 or amplitude controllers 404. In such cases, in response to receiving the indication 616, first base station 604 may instruct one or more of its UEs such as first UE 602 to increase their precision to mitigate the interference 614 if these UE(s) have a capability of dynamically changing their precision of phase shifters 402 or amplitude controllers 404. As an example, the first base station 604 may indicate in message 618 the precision level or target to which first UE 602 is to increase its phase shifter or amplitude control precision based on the UE's previously provided capability. For example, first base station 604 may indicate first UE 602 to increase its precision to at most B=5 bits to stay within the UE's supported bit precision. In another example, first base station 604 may indicate to first UE 602 in message 618 to increase its precision generally without expressly indicating the precision requirement, but still subject to the UE's reported capability. In such cases, first UE 602 may in response to the message 618 select to increase its precision of its phase shifters 402 or amplitude controllers 404 to at most B=5 bits or other supported bit precision based on the UE's capabilities (likewise previously reported in a capability information message).

While the example of FIG. 6 refers specifically to inter-cell interference, the aforementioned concepts may similarly apply to intra-cell interference. For example, first base station 604 may have multiple RF chains respectively used to receive uplink data from first UE 602 and to transmit downlink data to second UE 608 in the same, first cell 610. In such case, the uplink transmission from first UE 602 may similarly result in interference 614 on the downlink communication to second UE 608, but in this example second UE 608 may send indication 616 to first base station 604 (rather than second base station 606 in a neighboring cell). For example, indication 616 may similarly include an interference report indicating that second UE 608 is experiencing low SINR at a given time. After first base station 604 receives indication 616 from second UE 608, first base station 604 may send message 618 to first UE 602 to change its precision to address interference 614 as previously described.

Figure 7:
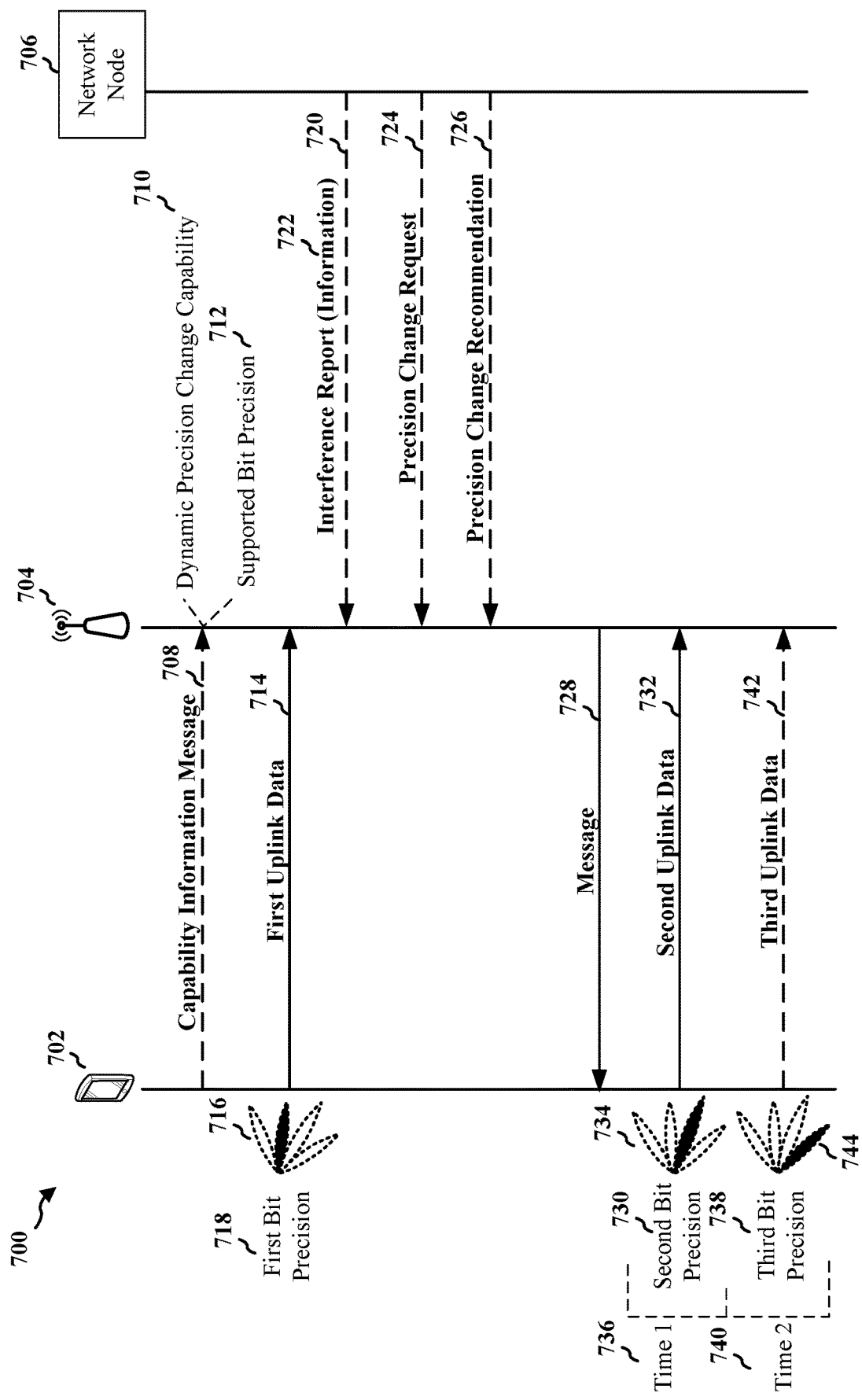
FIG. 7 illustrates an example of a call flow between a UE, a base station, and a network node.

FIG. 7 illustrates an example 700 of a call flow between a UE 702, a base station 704, and a network node 706. UE 702 may correspond to first UE 602, such as UE 104, 350. Base station 704 may correspond to first base station 604, such as base station 102/180, 310. Network node 706 may be, for example, another base station such as second base station 606, or another UE such as second UE 608. Optional messages are illustrated in dashed lines.

Initially, UE 702 may transmit a capability information message 708 to base station 704. The capability information message 708 may include capabilities of UE 702 including at least, for example, a dynamic precision change capability 710, a supported bit precision 712, or a combination of these capabilities. Dynamic precision change capability 710 may indicate whether UE 702 may dynamically change the precision of its phase shifters 402 or amplitude controllers 404, such as from B=2 bit precision to B=3 bit or 5 bit precision. Supported bit precision 712 may indicate a largest precision or value of B that UE 702 supports for its phase shifters 402 or amplitude controllers 404, such as B=3 or 5.

Afterwards, UE 702 may transmit first uplink data 714 to base station 704 in a first beam 716, such as using beamforming 182 in a narrow transmission beam via direction 502 or 504 in FIG. 5A or via a transmit direction 182' in a wide beam in FIGS. 1A and 5B. In transmitting the first uplink data 714, UE 702 may use or apply a first bit precision 718 for one or more of its phase shifters 402 or amplitude controllers 404, such as a B=2 bit precision. For example, when determining DFT beam weights during transmission precoding or other purposes, UE 702 may select one of four beam weights available with 2 bit precision to apply for first beam 716. If a side lobe of first beam 716 such as side lobe 506 or 552 results in interference 614 affecting downlink communications from network node 706 (if network node 706 corresponds to second base station 606) or to network node 706 (if network node 706 corresponds to second UE 608), then network node 706 may provide an indication 616 to base station 704 informing base station 704 of the interference 614 or requesting or recommending base station 704 to address the interference 614 via an instruction to UE 702 to change the precision of its phase shifters 402 or amplitude controllers 404. For example, network node 706 may transmit interference report 720 including information 722 regarding the interference 614 such as previously described in connection with FIG. 6, a precision change request 724, a precision change recommendation 726, a combination of any of the foregoing, or some other example of indication 616 to base station 704.

In response to the indication 616, base station 704 may transmit a message 728 such as message 618 to UE 702 (via broadcast, multicast, or unicast) to change from the first bit precision 718 to a second bit precision 730 for its phase shifters 402 or amplitude controllers 404. The message 728 may either expressly indicate the second bit precision 730, or the message 728 may inform the UE 702 more generally to change its precision (in which case the UE 702 selects to apply the second bit precision 730 on its own). Subsequently, UE 702 may transmit second uplink data 732 to base station 704 in a second beam 734, such as again using beamforming 182 in a narrow beam via a same or different direction 502 or 504 in FIG. 5A or a same or different wide beam in FIG. 5B. In transmitting the second uplink data 732, UE 702 may use or apply the second bit precision 730 for one or more of its phase shifters 402 or amplitude controllers 404, such as a B=5 bit precision. For example, when determining DFT beam weights during transmission precoding or other purposes, UE 702 may select one of thirty-two beam weights available with 5 bit precision to apply for second beam 734. In some cases, the message 728 may indicate the UE 702 to change from the first bit precision 718 (such as B=2 bit precision) to the second bit precision 730 (such as B=3 bit precision) for a first period of time 736 and then later to change to a third bit precision 738 (such as B=5 bit precision) for a second period of time 740. In such cases, UE 702 may transmit the second uplink data 732 to base station 704 in the second beam 734 using the second bit precision 730 during the first period of time 736 and later transmit third uplink data 742 in a third beam 744 to base station 704 using the third bit precision 738 during the second period of time 740. Thus, the interference 614 previously affecting network node 706 as a result of the first bit precision 718 may be reduced, minimized, or cancelled.

Figure 8:
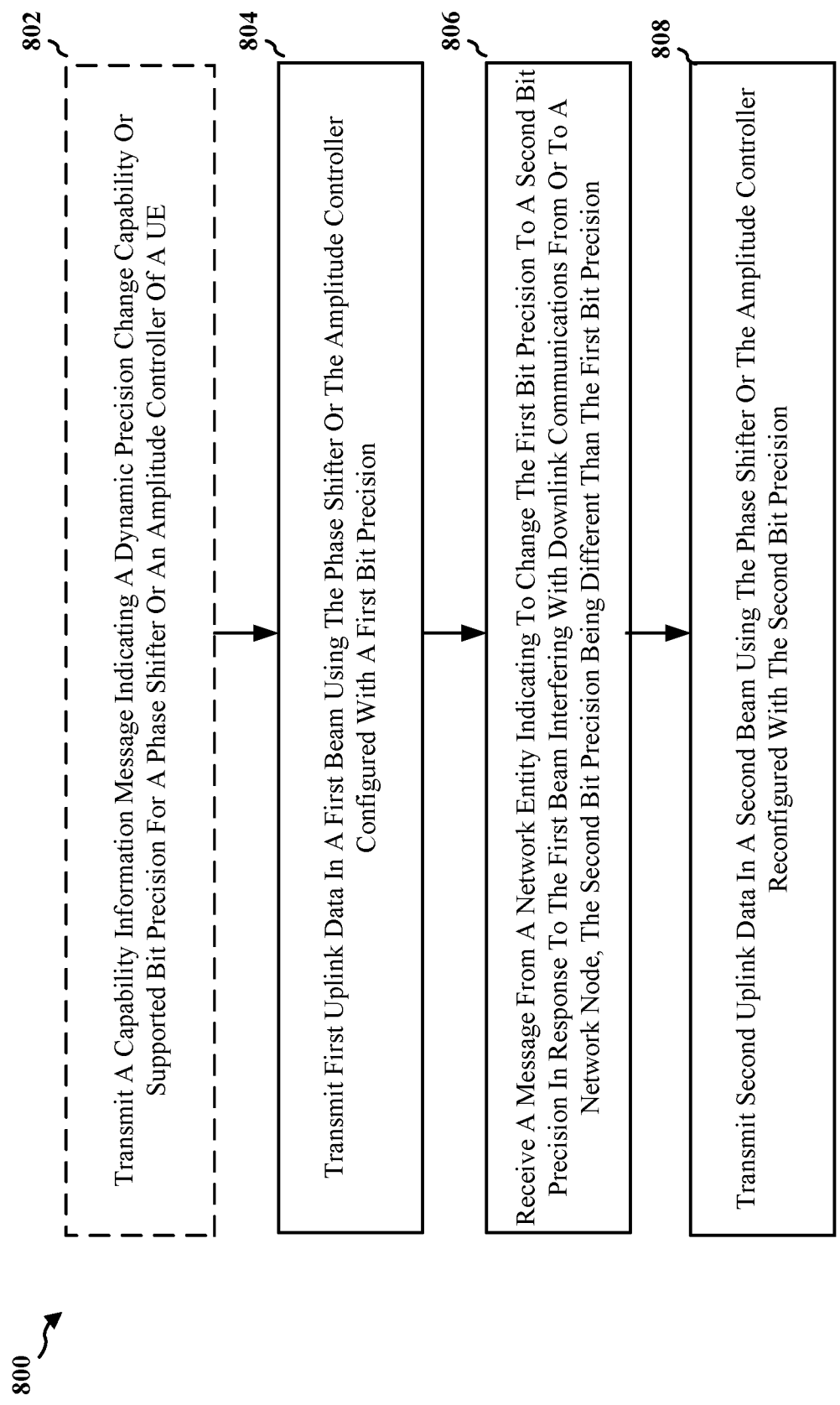
FIG. 8 is a flowchart of a method of wireless communication.

FIG. 8 is a flowchart 800 of a method of wireless communication. The method may be performed by a UE (e.g., the UE 104, 350, 602, 702; the apparatus 1002).

Optional aspects are illustrated in dashed lines. The method allows a UE to mitigate, through management of phase shifter or amplitude controller precision, increased interference applied to a network node during uplink beamforming resulting from low phase shift or amplitude control precision.

At 802, the UE may transmit a capability information message indicating a dynamic precision change capability or supported bit precision for a phase shifter or an amplitude controller of the UE. For example, 802 may be performed by capability information message component 1040. For instance, referring to FIG. 7, UE 702 may transmit capability information message 708 indicating dynamic precision change capability 710 or supported bit precision 712 for one or more phase shifters 402 or amplitude controllers 404 of the UE 702.

At 804, the UE may transmit first uplink data in a first beam using the phase shifter or the amplitude controller configured with a first bit precision. For example, 804 may be performed by first bit precision component 1042. For instance, referring to FIG. 7, UE 702 may transmit first uplink data 714 in first beam 716 using one or more of its phase shifters 402 or amplitude controllers 404 configured with first bit precision 718.

At 806, the UE may receive a message from a network entity indicating to change the first bit precision to a second bit precision in response to the first beam interfering with downlink communications from or to a network node, the second bit precision being different than the first bit precision. For example, 806 may be performed by message component 1044. For instance, referring to FIG. 7, UE 702 may receive message 728 from base station 704 (the network entity in this example) indicating to change the first bit precision 718 to second bit precision 730 different than the first bit precision 718 in response to first beam 716 resulting in interference 614 affecting downlink communications from or to network node 706.

In one example, the message may be responsive to a report indicating information regarding the interfering, such as interference report 720 including information 722 regarding interference 614 in FIG. 7.

In one example, the message may be responsive to a request to change the first bit precision to the second bit precision, such as precision change request 724 in FIG. 7.

In one example, the message may be responsive to a recommendation indicating a recommended bit precision such as precision change recommendation 726 in FIG. 7, where the second bit precision may be the recommended bit precision.

In one example, the network entity may be in a first cell including the UE, such as first cell 610 in FIG. 6, and the network node may be in the first cell or a second cell neighboring the first cell, such as second cell 612 in FIG. 6.

In one example, the network entity may be a first base station such as first base station 604 in FIG. 6, and the network node may be a second base station or a UE such as second base station 606 or second UE 608 in FIG. 6.

In one example, the message may be received in a broadcast or a multicast from the network entity and applies to multiple network nodes including the UE, such as first UE 602 and third UE 620 in FIG. 6.

In one example, the message may be received in a unicast from the network entity and applies specifically to the UE, such as first UE 602 in FIG. 6.

In one example, the message may be received in response to the dynamic precision change capability indicated at 802.

In one example, the second bit precision may be at most equal to the supported bit precision indicated at 802.

In one example, the message may indicate the second bit precision.

In one example, the message may indicate the UE to select the second bit precision.

In one example, the message may be indicated via an SSB, a CSI-RS, a PDSCH, a PDCCH, an RRC configuration, or a MAC-CE.

In one example, the message may indicate to change the first bit precision to the second bit precision for a first period of time, such as to second bit precision 730 during first period of time 736 in FIG. 7, and to a third bit precision for a second period of time, such as to third bit precision 738 during second period of time 740 in FIG. 7, where the third bit precision may be different than the second bit precision.

At 808, the UE may transmit second uplink data in a second beam using the phase shifter or the amplitude controller reconfigured with the second bit precision. For example, 808 may be performed by second bit precision component 1046. For instance, referring to FIG. 7, UE 702 may transmit second uplink data 732 in second beam 734 using one or more of the phase shifters 402 or amplitude controllers 404 reconfigured with second bit precision 730.

Figure 9:
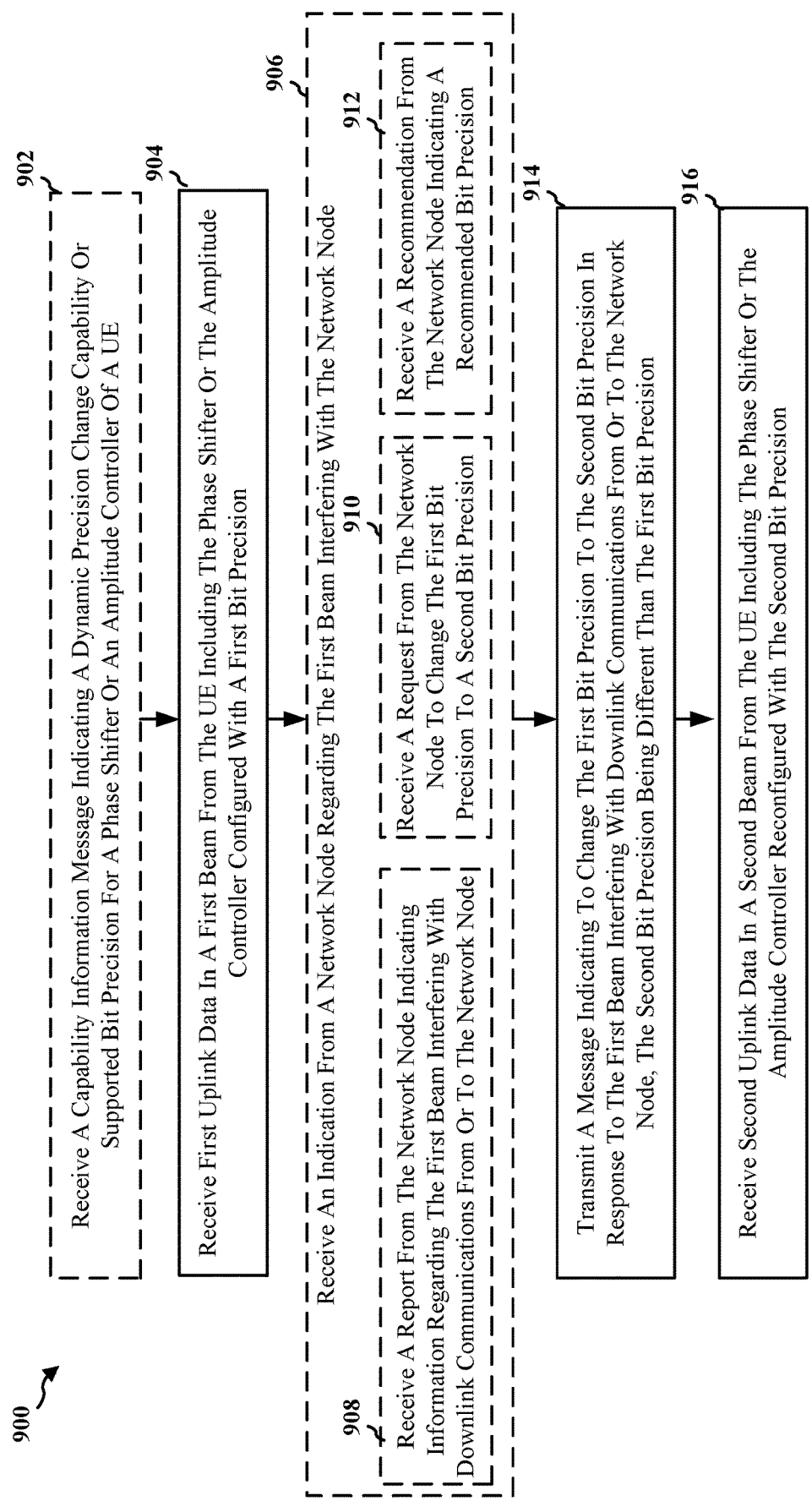
FIG. 9 is a flowchart of a method of wireless communication.

FIG. 9 is a flowchart 900 of a method of wireless communication. The method may be performed by a network entity (e.g., the base station 102/180, 181, 310, 604, 704; the apparatus 1102). Optional aspects are illustrated in dashed lines. The method allows a network entity to mitigate, through management of phase shifter or amplitude controller precision, increased interference applied to a network node during uplink beamforming resulting from low phase shift or amplitude control precision.

At 902, the network entity may receive a capability information message indicating a dynamic precision change capability or supported bit precision for a phase shifter or an amplitude controller of a UE. For example, 902 may be performed by capability information message component 1140.

At 904, the network entity may receive first uplink data in a first beam from the UE including the phase shifter or the amplitude controller configured with a first bit precision. For example, 904 may be performed by first bit precision component 1142.

At 906, the network entity may receive an indication from a network node regarding the first beam interfering with the network node. In one example, at 908, the network entity may receive a report from the network node indicating information regarding the first beam interfering with downlink communications from or to the network node. In another example, at 910, the network entity may receive a request from the network node to change the first bit precision to a second bit precision. In another example, at 912, the network entity may receive a recommendation from the network node indicating a recommended bit precision. 906 including 908, 910, and 912 may be performed by indication component 1144.

In one example, the network entity may be in a first cell including the UE, and the network node may be in the first cell or a second cell neighboring the first cell.

In one example, the network entity may be a first base station, and the network node may be a second base station or another UE.

At 914, the network entity may transmit a message indicating to change the first bit precision to the second bit precision in response to the first beam interfering with downlink communications from or to the network node, the second bit precision being different than the first bit precision. For example, 914 may be performed by message component 1146.

In one example, the message may be transmitted in response to the report received at 908.

In one example, the message may be transmitted in response to the request received at 910.

In one example, the message may be transmitted in response to the recommendation received at 912, where the second bit precision may be the recommended bit precision.

In one example, the message may be transmitted in response to the dynamic precision change capability indicated at 902.

In one example, the second bit precision may be at most equal to the supported bit precision indicated at 902.

In one example, the message may indicate the second bit precision or indicate the UE to select the second bit precision.

At 916, the network entity may receive second uplink data in a second beam from the UE including the phase shifter or the amplitude controller reconfigured with the second bit precision. For example, 916 may be performed by second bit precision component 1148.

Figure 10:
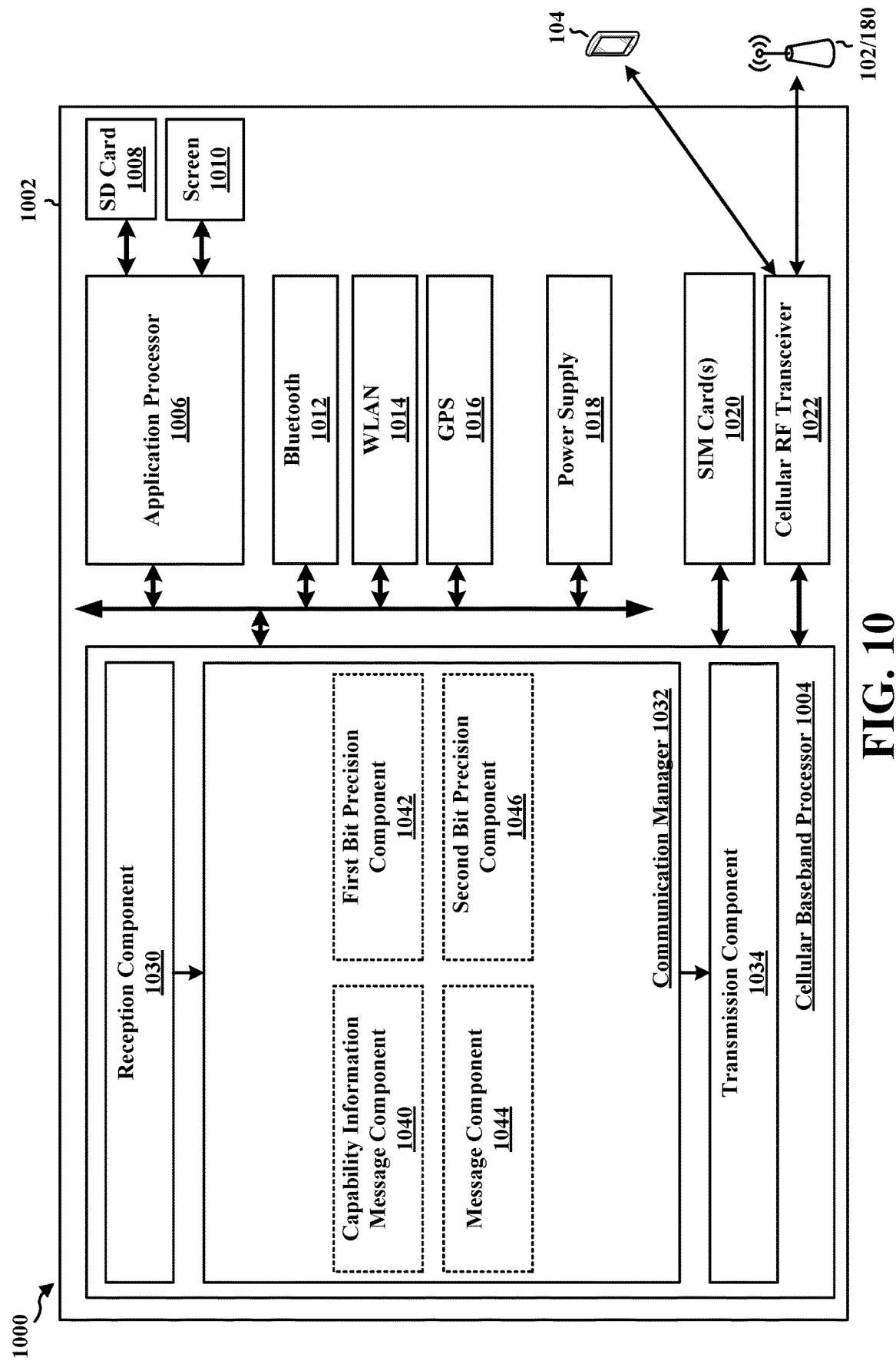
FIG. 10 is a diagram illustrating an example of a hardware implementation for an apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a capability information message component 1040 that is configured to transmit a capability information message indicating a dynamic precision change capability or supported bit precision for a phase shifter or an amplitude controller of a UE, e.g., as described in connection with 802. The communication manager 1032 includes a first bit precision component 1042 that is configured to transmit first uplink data in a first beam using the phase shifter or the amplitude controller configured with a first bit precision, e.g., as described in connection with 804. The communication manager 1032 includes a message component 1044 that is configured to receive a message from a network entity indicating to change the first bit precision to a second bit precision in response to the first beam interfering with downlink communications from or to a network node, the second bit precision being different than the first bit precision, e.g., as described in connection with 806. The communication manager 1032 includes a second bit precision component 1046 that is configured to transmit second uplink data in a second beam using the phase shifter or the amplitude controller reconfigured with the second bit precision, e.g., as described in connection with 808.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for transmitting first uplink data in a first beam using a phase shifter or an amplitude controller configured with a first bit precision, and means for receiving a message from a network entity indicating to change the first bit precision to a second bit precision in response to the first beam interfering with downlink communications from or to a network node, the second bit precision being different than the first bit precision. The means for transmitting is further configured to transmit second uplink data in a second beam using the phase shifter or the amplitude controller reconfigured with the second bit precision.

In one configuration, the means for transmitting may be further configured to transmit a capability information message indicating a dynamic precision change capability of the UE for the phase shifter or the amplitude controller.

In one configuration, the means for transmitting may be further configured to transmit a capability information message indicating a supported bit precision of the UE for the phase shifter or the amplitude controller.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
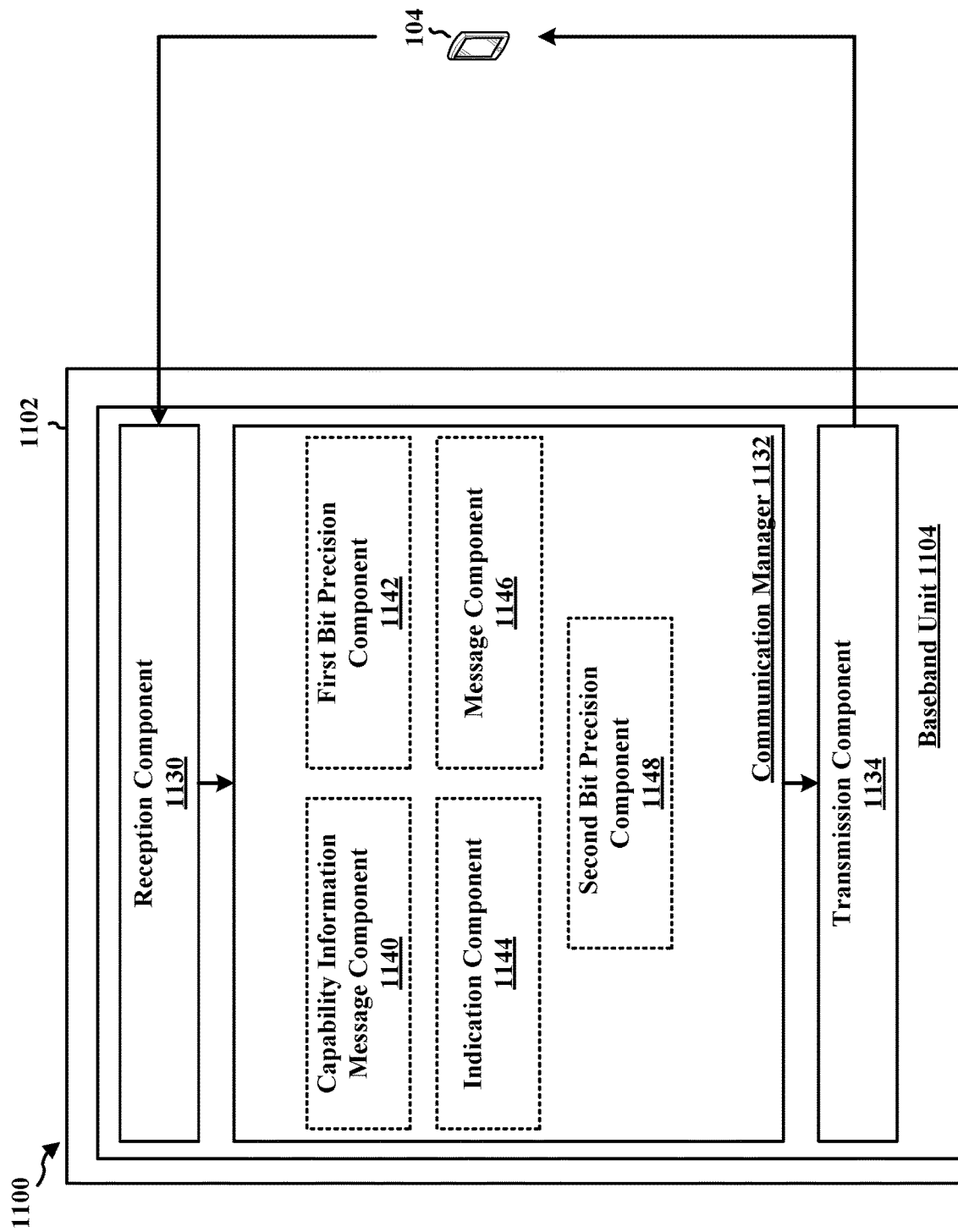
FIG. 11 is a diagram illustrating an example of a hardware implementation for an apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a capability information message component 1140 that is configured to receive a capability information message indicating a dynamic precision change capability or supported bit precision for a phase shifter or an amplitude controller of a UE, e.g., as described in connection with 902. The communication manager 1132 further includes a first bit precision component 1142 that is configured to receive first uplink data in a first beam from the UE including the phase shifter or the amplitude controller configured with a first bit precision, e.g., as described in connection with 904. The communication manager 1132 further includes an indication component 1144 that is configured to receive a report from the network node indicating information regarding the first beam interfering with downlink communications from or to the network node, e.g., as described in connection with 908, receive a request from the network node to change the first bit precision to a second bit precision, e.g., as described in connection with 910, and receive a recommendation from the network node indicating a recommended bit precision, e.g., as described in connection with 912. The communication manager 1132 further includes a message component 1146 that is configured to transmit a message indicating to change the first bit precision to the second bit precision in response to the first beam interfering with downlink communications from or to the network node, the second bit precision being different than the first bit precision, e.g., as described in connection with 914. The communication manager 1132 further includes a second bit precision component 1148 that is configured to receive second uplink data in a second beam from the UE including the phase shifter or the amplitude controller reconfigured with the second bit precision, e.g., as described in connection with 916.

The apparatus may include additional components that perform each of the blocks of the algorithm in the aforementioned flowcharts of FIGS. 7 and 9. As such, each block in the aforementioned flowcharts of FIGS. 7 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for receiving first uplink data in a first beam from a UE including a phase shifter or an amplitude controller configured with a first bit precision; and means for transmitting a message indicating to change the first bit precision to a second bit precision in response to the first beam interfering with downlink communications from or to a network node, the second bit precision being different than the first bit precision. The means for receiving is further configured to receive second uplink data in a second beam from the UE including the phase shifter or the amplitude controller reconfigured with the second bit precision.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Clause 1. An apparatus for wireless communication, comprising: a processor; memory coupled with the processor; and instructions stored in the memory and operable, when executed by the processor, to cause the apparatus to: transmit first uplink data in a first beam using a phase shifter or an amplitude controller configured with a first bit precision; receive a message from a network entity indicating to change the first bit precision to a second bit precision in response to the first beam interfering with downlink communications from or to a network node, the second bit precision being different than the first bit precision; and transmit second uplink data in a second beam using the phase shifter or the amplitude controller reconfigured with the second bit precision.

Clause 2. The apparatus of clause 1, wherein the message is responsive to a report indicating information regarding the interfering.

Clause 3. The apparatus of clause 1 or clause 2, wherein the message is responsive to a request to change the first bit precision to the second bit precision.

Clause 4. The apparatus of any of clauses 1 to 3, wherein the message is responsive to a recommendation indicating a recommended bit precision, the second bit precision being the recommended bit precision.

Clause 5. The apparatus of any of clauses 1 to 4, wherein the network entity is in a first cell including the apparatus, and the network node is in the first cell or a second cell neighboring the first cell.

Clause 6. The apparatus of clause 5, wherein the network entity is a first base station, and the network node is a second base station or a user equipment (UE).

Clause 7. The apparatus of any of clauses 1 to 6, wherein the message is received in a broadcast or a multicast from the network entity and applies to multiple network nodes including the apparatus.

Clause 8. The apparatus of any of clauses 1 to 6, wherein the message is received in a unicast from the network entity and applies specifically to the apparatus.

Clause 9. The apparatus of any of clauses 1 to 8, wherein the instructions, when executed by the processor, further cause the apparatus to: transmit a capability information message indicating a dynamic precision change capability of the apparatus for the phase shifter or the amplitude controller, the message being received in response to the dynamic precision change capability.

Clause 10. The apparatus of any of clauses 1 to 9, wherein the instructions, when executed by the processor, further cause the apparatus to: transmit a capability information message indicating a supported bit precision of the apparatus for the phase shifter or the amplitude controller, the second bit precision being at most equal to the supported bit precision.

Clause 11. The apparatus of any of clauses 1 to 10, wherein the message indicates the second bit precision.

Clause 12. The apparatus of any of clauses 1 to 10, wherein the message indicates the apparatus to select the second bit precision.

Clause 13. The apparatus of any of clauses 1 to 12, wherein the message is indicated via a synchronization signal block (SSB), a channel state information reference signal (CSI-RS), a physical downlink shared channel (PDSCH), a physical downlink control channel (PDCCH), a radio resource control (RRC) configuration, or a medium access control (MAC) control element (MAC-CE).

Clause 14. The apparatus of any of clauses 1 to 13, wherein the message indicates to change the first bit precision to the second bit precision for a first period of time and to a third bit precision for a second period of time, the third bit precision being different than the second bit precision.

Clause 15. A method of wireless communication at a user equipment (UE), comprising: transmitting first uplink data in a first beam using a phase shifter or an amplitude controller configured with a first bit precision; receiving a message from a network entity indicating to change the first bit precision to a second bit precision in response to the first beam interfering with downlink communications from or to a network node, the second bit precision being different than the first bit precision; and transmitting second uplink data in a second beam using the phase shifter or the amplitude controller reconfigured with the second bit precision.

Clause 16. The method of clause 15, wherein the message is responsive to a report indicating information regarding the interfering.

Clause 17. The method of clause 15 or clause 16, wherein the message is responsive to a request to change the first bit precision to the second bit precision.

Clause 18. The method of any of clauses 15 to 17, wherein the message is responsive to a recommendation indicating a recommended bit precision, the second bit precision being the recommended bit precision.

Clause 19. The method of any of clauses 15 to 18, further comprising: transmitting a capability information message indicating a dynamic precision change capability of the UE for the phase shifter or the amplitude controller, the message being received in response to the dynamic precision change capability.

Clause 20. The method of any of clauses 15 to 19, further comprising: transmitting a capability information message indicating a supported bit precision of the UE for the phase shifter or the amplitude controller, the second bit precision being at most equal to the supported bit precision.

Clause 21. An apparatus for wireless communication, comprising: a processor; memory coupled with the processor; and instructions stored in the memory and operable, when executed by the processor, to cause the apparatus to: receive first uplink data in a first beam from a user equipment (UE) including a phase shifter or an amplitude controller configured with a first bit precision; transmit a message indicating to change the first bit precision to a second bit precision in response to the first beam interfering with downlink communications from or to a network node, the second bit precision being different than the first bit precision; and receive second uplink data in a second beam from the UE including the phase shifter or the amplitude controller reconfigured with the second bit precision.

Clause 22. The apparatus of clause 21, wherein the instructions, when executed by the processor, further cause the apparatus to: receive a report from the network node indicating information regarding the interfering, the message being transmitted in response to the report.

Clause 23. The apparatus of clause 21 or 22, wherein the instructions, when executed by the processor, further cause the apparatus to: receive a request from the network node to change the first bit precision to the second bit precision, the message being transmitted in response to the request.

Clause 24. The apparatus of any of clauses 21 to 23, wherein the instructions, when executed by the processor, further cause the apparatus to: receive a recommendation from the network node indicating a recommended bit precision, the message being transmitted in response to the recommendation, and the second bit precision being the recommended bit precision.

Clause 25. The apparatus of any of clauses 21 to 24, wherein the instructions, when executed by the processor, further cause the apparatus to: receive a capability information message indicating a dynamic precision change capability of the UE for the phase shifter or the amplitude controller, the message being transmitted in response to the dynamic precision change capability.

Clause 26. The apparatus of any of clauses 21 to 25, wherein the instructions, when executed by the processor, further cause the apparatus to: receive a capability information message indicating a supported bit precision of the UE for the phase shifter or the amplitude controller, the second bit precision being at most equal to the supported bit precision.

Clause 27. The apparatus of any of clauses 21 to 26, wherein the apparatus is in a first cell including the UE, and the network node is in the first cell or a second cell neighboring the first cell.

Clause 28. The apparatus of clause 27, wherein the apparatus is a first base station, and the network node is a second base station or another UE.

Clause 29. A method of wireless communication at a network entity, comprising: receiving first uplink data in a first beam from a user equipment (UE) including a phase shifter or an amplitude controller configured with a first bit precision; transmitting a message indicating to change the first bit precision to a second bit precision in response to the first beam interfering with downlink communications from or to a network node, the second bit precision being different than the first bit precision; and receiving second uplink data in a second beam from the UE including the phase shifter or the amplitude controller reconfigured with the second bit precision.

Clause 30. The method of clause 29, wherein the message indicates the second bit precision or indicates the UE to select the second bit precision.

What is claimed is:

1. An apparatus for wireless communication, comprising:
a processor;
memory coupled with the processor; and
instructions stored in the memory and operable, when executed by the processor, to cause the apparatus to:
transmit first uplink data in a first beam using a phase shifter or an amplitude controller configured with a first bit precision;
receive a message from a network entity indicating to change the first bit precision to a second bit precision in response to the first beam interfering with downlink communications from or to a network node, the second bit precision being different than the first bit precision; and
transmit second uplink data in a second beam using the phase shifter or the amplitude controller reconfigured with the second bit precision.

2. The apparatus of claim 1, wherein the message is responsive to a report indicating information regarding the interfering.

3. The apparatus of claim 1, wherein the message is responsive to a request to change the first bit precision to the second bit precision.

4. The apparatus of claim 1, wherein the message is responsive to a recommendation indicating a recommended bit precision, the second bit precision being the recommended bit precision.

5. The apparatus of claim 1, wherein the network entity is in a first cell including the apparatus, and the network node is in the first cell or a second cell neighboring the first cell.

6. The apparatus of claim 5, wherein the network entity is a first base station, and the network node is a second base station or a user equipment (UE).

7. The apparatus of claim 1, wherein the message is received in a broadcast or a multicast from the network entity and applies to multiple network nodes including the apparatus.

8. The apparatus of claim 1, wherein the message is received in a unicast from the network entity and applies specifically to the apparatus.

9. The apparatus of claim 1, wherein the instructions, when executed by the processor, further cause the apparatus to:
transmit a capability information message indicating a dynamic precision change capability of the apparatus for the phase shifter or the amplitude controller, the message being received in response to the dynamic precision change capability.

10. The apparatus of claim 1, wherein the instructions, when executed by the processor, further cause the apparatus to:
transmit a capability information message indicating a supported bit precision of the apparatus for the phase shifter or the amplitude controller, the second bit precision being at most equal to the supported bit precision.

11. The apparatus of claim 1, wherein the message indicates the second bit precision.

12. The apparatus of claim 1, wherein the message indicates the apparatus to select the second bit precision.

13. The apparatus of claim 1, wherein the message is indicated via a synchronization signal block (SSB), a channel state information reference signal (CSI-RS), a physical downlink shared channel (PDSCH), a physical downlink control channel (PDCCH), a radio resource control (RRC) configuration, or a medium access control (MAC) control element (MAC-CE).

14. The apparatus of claim 1, wherein the message indicates to change the first bit precision to the second bit precision for a first period of time and to a third bit precision for a second period of time, the third bit precision being different than the second bit precision.

15. A method of wireless communication at a user equipment (UE), comprising:
transmitting first uplink data in a first beam using a phase shifter or an amplitude controller configured with a first bit precision;
receiving a message from a network entity indicating to change the first bit precision to a second bit precision in response to the first beam interfering with downlink communications from or to a network node, the second bit precision being different than the first bit precision; and
transmitting second uplink data in a second beam using the phase shifter or the amplitude controller reconfigured with the second bit precision.

16. The method of claim 15, wherein the message is responsive to a report indicating information regarding the interfering.

17. The method of claim 15, wherein the message is responsive to a request to change the first bit precision to the second bit precision.

18. The method of claim 15, wherein the message is responsive to a recommendation indicating a recommended bit precision, the second bit precision being the recommended bit precision.

19. The method of claim 15, further comprising:
transmitting a capability information message indicating a dynamic precision change capability of the UE for the phase shifter or the amplitude controller, the message being received in response to the dynamic precision change capability.

20. The method of claim 15, further comprising:
transmitting a capability information message indicating a supported bit precision of the UE for the phase shifter or the amplitude controller, the second bit precision being at most equal to the supported bit precision.

21. An apparatus for wireless communication, comprising:
a processor;
memory coupled with the processor; and
instructions stored in the memory and operable, when executed by the processor, to cause the apparatus to:
receive first uplink data in a first beam from a user equipment (UE) including a phase shifter or an amplitude controller configured with a first bit precision;
transmit a message indicating to change the first bit precision to a second bit precision in response to the first beam interfering with downlink communications from or to a network node, the second bit precision being different than the first bit precision; and
receive second uplink data in a second beam from the UE including the phase shifter or the amplitude controller reconfigured with the second bit precision.

22. The apparatus of claim 21, wherein the instructions, when executed by the processor, further cause the apparatus to:
receive a report from the network node indicating information regarding the interfering, the message being transmitted in response to the report.

23. The apparatus of claim 21, wherein the instructions, when executed by the processor, further cause the apparatus to:
receive a request from the network node to change the first bit precision to the second bit precision, the message being transmitted in response to the request.

24. The apparatus of claim 21, wherein the instructions, when executed by the processor, further cause the apparatus to:
receive a recommendation from the network node indicating a recommended bit precision, the message being transmitted in response to the recommendation, and the second bit precision being the recommended bit precision.

25. The apparatus of claim 21, wherein the instructions, when executed by the processor, further cause the apparatus to:
receive a capability information message indicating a dynamic precision change capability of the UE for the phase shifter or the amplitude controller, the message being transmitted in response to the dynamic precision change capability.

26. The apparatus of claim 21, wherein the instructions, when executed by the processor, further cause the apparatus to:
receive a capability information message indicating a supported bit precision of the UE for the phase shifter or the amplitude controller, the second bit precision being at most equal to the supported bit precision.

27. The apparatus of claim 21, wherein the apparatus is in a first cell including the UE, and the network node is in the first cell or a second cell neighboring the first cell.

28. The apparatus of claim 27, wherein the apparatus is a first base station, and the network node is a second base station or another UE.

29. A method of wireless communication at a network entity, comprising:
receiving first uplink data in a first beam from a user equipment (UE) including a phase shifter or an amplitude controller configured with a first bit precision;
transmitting a message indicating to change the first bit precision to a second bit precision in response to the first beam interfering with downlink communications from or to a network node, the second bit precision being different than the first bit precision; and
receiving second uplink data in a second beam from the UE including the phase shifter or the amplitude controller reconfigured with the second bit precision.

30. The method of claim 29, wherein the message indicates the second bit precision or indicates the UE to select the second bit precision.

* * * * *